(12) United States Patent
Greer et al.

(10) Patent No.: US 9,887,544 B2
(45) Date of Patent: Feb. 6, 2018

(54) SYSTEM AND METHOD FOR MATHEMATICAL PREDICTIVE ANALYTICS AND COMPUTATIONAL ENERGY MODELING

(71) Applicants: LOCKHEED MARTIN CORPORATION, Bethesda, MD (US); Manuel Rodriguez-Martinez, Boqueron, PR (US)

(72) Inventors: Melvin Greer, Ashburn, VA (US); Manuel Rodriguez-Martinez, Boqueron, PR (US)

(73) Assignees: Lockheed Martin Corporation, Bethesda, MD (US); Manuel Rodriguez-Artinez, Boqueron, PR (US)

( * ) Notice: Subject to any disclaimer, the term of this patent is extended or adjusted under 35 U.S.C. 154(b) by 839 days.

(21) Appl. No.: 14/186,339

(22) Filed: Feb. 21, 2014

(65) Prior Publication Data

US 2014/0306525 A1    Oct. 16, 2014

Related U.S. Application Data

(60) Provisional application No. 61/812,110, filed on Apr. 15, 2013.

(51) Int. Cl.
*H02J 3/06* (2006.01)
*H02J 3/00* (2006.01)
*H02J 3/38* (2006.01)

(52) U.S. Cl.
CPC ............ *H02J 3/06* (2013.01); *H02J 3/008* (2013.01); *H02J 3/381* (2013.01); *Y04S 50/10* (2013.01); *Y10T 307/352* (2015.04)

(58) Field of Classification Search
CPC .. G05D 3/12; G05D 5/00; G05D 9/00; G05D 11/00; G05D 17/00; G06F 17/00; G07F 19/00; G06Q 10/00; G08B 23/00
(Continued)

(56) References Cited

U.S. PATENT DOCUMENTS

2003/0187550 A1* 10/2003 Wilson ...................... H02J 3/14
                                                          700/295
2008/0046387 A1*  2/2008 Gopal .................... G01D 4/004
                                                          705/412

(Continued)

*Primary Examiner* — Thienvu Tran
*Assistant Examiner* — David M Stables
(74) *Attorney, Agent, or Firm* — Withrow & Terranova, PLLC

(57) ABSTRACT

Mechanisms for controlling a micro electrical power grid to select the volume of electricity produced by power generation sources in order to meet demand and achieve a particular optimization goal. In one embodiment, a system operable to control a micro electrical power grid may include a plurality of intelligent power broker (IPB) units and at least one data analytics unit in communication with the IPB units. Each IPB may be associated with an electrical power source or an electrical load and may be operable to collect data relating to its associated electrical power source or electrical load. The data analytics unit may receive the data from the IPB units and may be operable to analyze the data and direct the IPB s to remove one or more of the electrical power loads from the micro electrical grid and/or increase an electrical power output from the electrical sources during time period T.

20 Claims, 4 Drawing Sheets

(58) Field of Classification Search
USPC ........ 307/24, 43, 52, 57, 59, 72, 73, 76, 80, 307/84, 157; 700/286, 295; 705/34, 412
See application file for complete search history.

(56) References Cited

U.S. PATENT DOCUMENTS

| | | | | |
|---|---|---|---|---|
| 2011/0307109 A1* | 12/2011 | Sri-Jayantha | .......... | G06Q 10/04 700/291 |
| 2012/0029720 A1* | 2/2012 | Cherian | .................. | H02J 13/00 700/297 |

* cited by examiner

SYSTEM AND METHOD FOR MATHEMATICAL PREDICTIVE ANALYTICS AND COMPUTATIONAL ENERGY MODELING

RELATED APPLICATION INFORMATION

This application claims priority from U.S. Provisional Application Ser. No. 61/812,110, entitled "ADVANCED SENSOR FOR ENERGY BROKERAGE" filed on Apr. 15, 2013, which is incorporated by reference herein in its entirety.

FIELD OF THE INVENTION

The present invention relates generally to managing electrical grids, and more particularly to managing smart electrical grids having distributed localized electrical generation.

BACKGROUND OF THE INVENTION

Modern electric power grids may combine a diverse array of power generation units fueled by coal, nuclear energy, natural gas, solar power, wind, oil, biodiesel, and/or hydro power, just to name a few. However, some of these power sources may not provide a sustained, reliable energy source for power generation. For instance, renewable power sources, such as solar power and wind, may be susceptible to environmental factors that might hinder their availability when electricity is badly needed. Hence, these power sources are often called intermittent because there might be periods of gaps in their availability. On the other hand, more stable energy sources, such as coal, oil, or natural gas, often produce undesired pollutants as a by-product of their operation. This has resulted in environmental regulations that limit these emissions and hence restrict their use.

The emergence of Smart Grid initiatives throughout the world is forcing rapid change and decentralized operation of the electric grid. A Smart Grid uses sensors, digital communications, and computer software to help collect real-time information from the grid and automate its operation. Smart Grid systems can automatically fix problems in the energy grid by isolating faulting areas, bringing extra power generation online, opening new power lines, or shedding low priority loads from the system. The widespread interest in renewable power sources brings the problem of managing distributed power generation to the forefront. The use of intermittent power sources requires new operational models that take into consideration not only future demand but also future availability of power sources and the cost of the energy they produce. A Micro Grid environment provides a scaled down Smart Grid, capable of running without transmission lines (which are used to bring electricity from far away power generators) by virtue of localized energy generators. Typically, these nearby generators run on natural gas, diesel, or renewable energy. Micro Grids environments are ideal for studying the problems posed by new management challenges arising from distributed generation, autonomous operation, energy storage, and energy sales.

SUMMARY OF THE INVENTION

The present inventors have recognized that modern Smart Grids, and in particular Micro Grid environments, need to be designed with new capabilities to maximize electricity production, while minimizing pollution, costs, and service interruptions. First, the Smart Grid must assess the availability of all power sources and the duration of the energy reserves for producing electricity. Next, the Smart Grid must estimate current and future energy demands for its customer base. Finally, the Smart Grid needs to choose a volume of electricity to be produced by each power generation unit in order to meet demand while reaching a specific goal in terms of reducing cost, pollution, and service interruptions.

Accordingly, a system, method and computer program product for controlling a micro electrical power grid (e.g., a Micro Grid) provides a framework to help select the volume of electricity to be produced by each power generation source in order to meet demand and reach a particular optimization goal, including for example, minimizing the total amount of energy produced from fossil fuels, minimizing the total cost of electricity produced by all the power sources in operation, and maximizing the total amount of energy produced from renewable sources.

In one aspect, a system operable to control a micro electrical power grid comprising one or more electrical power sources and one or more electrical loads, may include a plurality of intelligent power broker (IPB) units and at least one data analytics unit in communication with said IPB units. The data analytics unit and the IPBs may communicate, for example, via data network. Each IPB may be associated with an electrical power source or an electrical load and may be operable to collect data relating to its associated electrical power source or electrical load. The data collected by an IPB associated with an electrical power source may include a current electrical power output level (e.g., how much electrical power the source is currently providing) and a reserve electrical power generation level (e.g., how much additional electrical power, if any, the source could provide) of its associated electrical power source. The data collected by an IPB associated with an electrical load may include an electrical power demand level of its associated electrical load. The data analytics unit may receive the data from the IPB units and may be operable to analyze the data to estimate a combined electrical power output level of the electrical power sources, a combined reserve electrical power generation capability level of the electrical power sources and a combined electrical power demand level of the electrical loads during a time period T. The data analytics unit may also be operable to direct the IPBs to accomplish at least one of removing one or more of the electrical power loads from the micro electrical grid and increasing an electrical power output from the electrical sources during time period T.

In another aspect a method of managing a micro electrical power grid comprising one or more electrical power sources and one or more electrical loads may include receiving data from a plurality of intelligent power broker (IPB) units, wherein each IPB is associated with an electrical power source or an electrical load. The data received from an IPB associated with an electrical power source may include a current electrical power output level and a reserve electrical power generation level. The data received from an IPB associated with an electrical load may include an electrical power demand level. The method may also include initializing a vector V with values of current micro electrical grid conditions, wherein V includes values of current electrical power output levels of the electrical power sources, reserve electrical power generation levels of the electrical power sources and electrical power demand levels of the electrical loads during a time period T. The method may further include first determining whether a current combined electrical power output level meets a combined electrical power demand level over time period T. When it is determined that the combined electrical power output level meets the combined electrical power demand level, the method may repeat the steps of receiving, initializing and first determining for a subsequent time period prior to expiration of time period T. When it is determined that the combined electrical power output level does not meet the combined electrical power demand level, the method may include second determining whether a combined reserve electrical power generation level is sufficient to meet the combined electrical power demand level when added to the current combined electrical power output level. When it is determined that there is sufficient combined reserve electrical power generation, the method may include re-computing vector V to include new electrical power output levels for the electrical power sources and instructing the electrical power sources via their associated IPBs to produce electrical energy at the new electrical power output levels specified in recomputed vector V. When it is determined that there is not sufficient combined reserve electrical power generation capability, the method may include identifying one or more of the electrical power loads for temporary disconnection from the micro electrical grid during time period T to achieve a reduced combined electrical power demand level balanced by the current combined electrical power output level.

In a further aspect, a computer program product executable to manage a micro electrical power grid comprising one or more electrical power sources and one or more electrical load may include a non-transitory computer usable medium having computer program code embodied therein. The computer program code may include computer readable program code executable by a processor to initialize a vector V with values of current micro electrical grid conditions, wherein V includes values of current electrical power output levels of the electrical power sources, reserve electrical power generation levels of the electrical power sources and electrical power demand levels of the electrical loads during a time period T. The computer program code may also include computer readable program code executable by a processor to first determine whether a current combined electrical power output level meets a combined electrical power demand level over time period T. The computer program code may also include computer readable program code executable by a processor, when it is determined that the combined electrical power output level meets the combined electrical power demand level, to repeat the initializing and first determining for a subsequent time period prior to expiration of time period T. The computer program code may also include computer readable program code executable by a processor, when it is determined that the combined electrical power output level does not meet the combined electrical power demand level, to second determine whether a combined reserve electrical power generation level is sufficient to meet the combined electrical power demand level when added to the current combined electrical power output level. The computer program code may also include computer readable program code executable by a processor, when it is determined that there is sufficient combined reserve electrical power generation, to re-compute vector V to include new electrical power output levels for the electrical power sources and generate instructions for the electrical power sources to produce electrical energy at the new electrical power output levels specified in recomputed vector V. The computer program code may also include computer readable program code executable by a processor, when it is determined that there is not sufficient combined reserve electrical power generation capability, to identify one or more of the electrical power loads for temporary disconnection from the micro electrical grid during time period T to achieve a reduced combined electrical power demand level balanced by the current combined electrical power output level.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
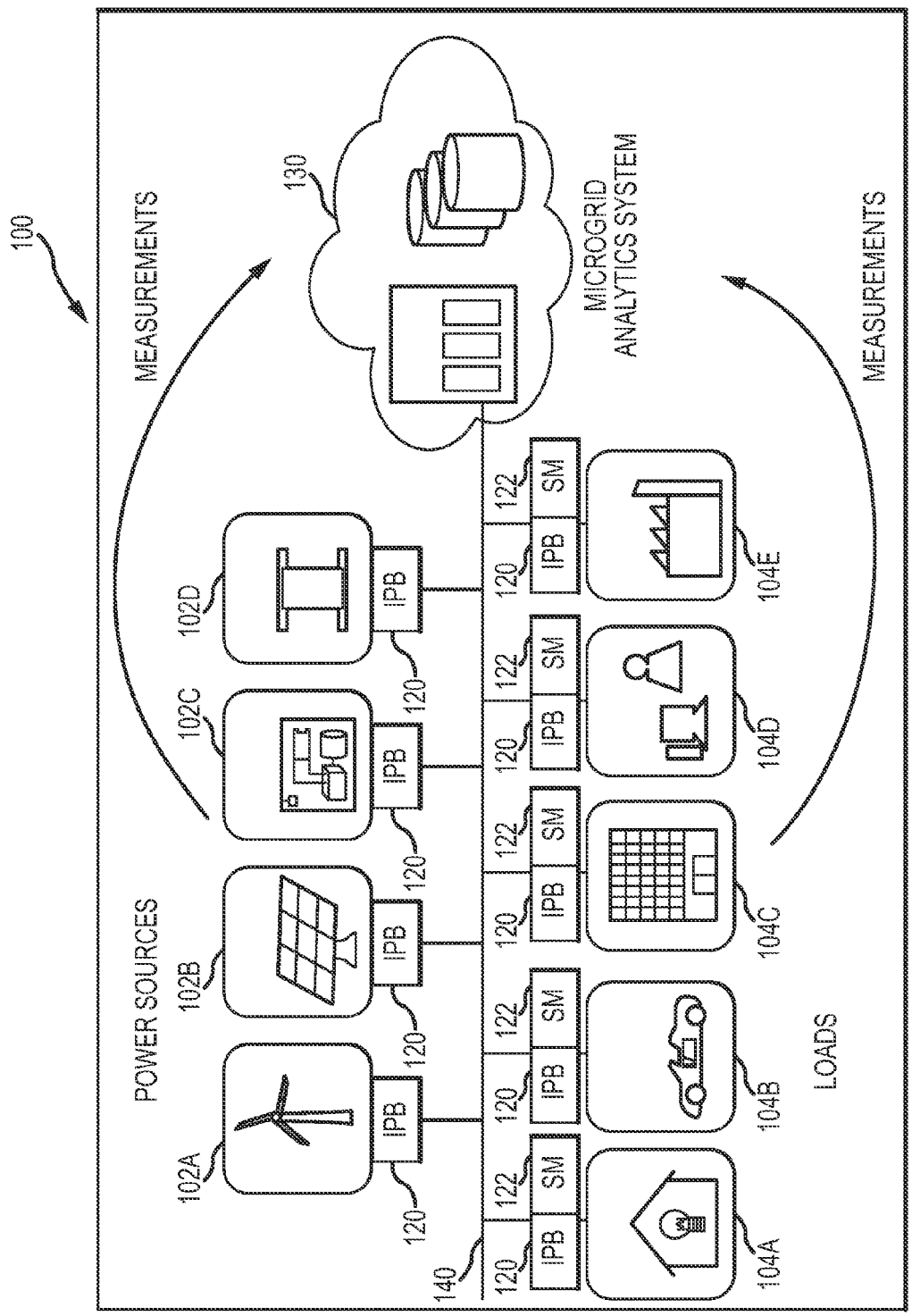
FIG. 1 is a block diagram showing one embodiment of a managed a micro electrical power grid system.

FIG. 1 shows one embodiment of a managed micro electrical power grid 100 system architecture. The micro electrical power grid 100 may include a one or more electrical power sources 102A-102D and one or more electrical loads 104A-104E. As may be typical in a Micro Grid environment, the micro electrical power grid 100 may be configured without transmission lines bringing electricity from distant sources and may instead rely on localized distributed electricity generation. In this regard, the electrical power sources 102A-102D may, for example, include renewable sources such as wind 102A and solar 102B, diesel/natural gas generators 102C, and battery banks 102D. Other electrical power sources that are not illustrated such as, for example, geothermal, fuel cells, and micro-turbines may also be included in the micro electrical power grid 100 architecture. The electrical loads 104A-104F may, for example, include homes 104A, vehicles 104B, office buildings 104C, data centers 104D, factories 104E and other items that consume electricity.

Individual intelligent power broker (IPB) units 120 are associated with each electrical power source 102A-102D and each electrical load 104A-104E. The micro electrical power grid 100 architecture may also include a data analytics unit 130 in communication via a data network 140 with the intelligent power broker (IPB) units 120 associated with respective electrical power sources 102A-102D or electrical loads 104A-104B. The data analytics unit 130 may utilize measurements and other data received from the IPBs 120 via the data network 140 to manage and deploy energy generation schemes designed to optimize the use of currently available energy sources within the micro electrical power grid 100. As part of managing and deploying optimal energy generation schemes, the data analytics unit 130 may also utilize weather data, customer data, and energy price data from various other sources (not shown in FIG. 1).

The IPBs 120 associated with the electrical power sources 102A-102D may have various functional capabilities. In this regard, each IPB 120 associated with an electrical power sources 102A-102D may, for example, be enabled to: (1) monitor the current health of its respective electrical power source 102A-102D; (2) monitor the current power output, reserve power output, and energy reserves for generation of its respective electrical power source 102A-102D; (3) request a change (e.g., an increase or a decrease) in electrical power output from its respective electrical power source 102A-102D based on demand from the electrical loads 104A-104E; and (4) collect operational statistics and provide this to the data analytics unit 130 located within the micro electrical power grid 100. As such, the IPBs 120 facilitate the provision of real-time, decentralized operational control of the micro electrical power grid 100.

The IPBs 120 associated with the electrical loads 104A-104E may be combined with smart meter (SM) units 122. Rather than monitor electrical generation/output from the electrical power sources 102A-102D, the IPBs 120 associated with the electrical loads 104A-104E monitor consumption of electricity by the electrical loads 104A-104E. The IPBs 120 associated with the electrical loads 104A-104E may also capable of directing their respective SM units 122 to selectively shed (e.g., electrically disconnect from the micro electrical power grid) one or more of the electrical loads 104A-104E deemed to be of low priority when energy is scarce. Like the IPBs 120 associated with the electrical power sources 102A-102D, the IPBs 120 associated with the electrical loads 104A-104E collect statistics that are sent to the data analytics unit 130.

Although only one data analytics unit 130 is shown in FIG. 1, there may be more than one data analytics unit 130 included in the micro electrical power grid 100. In this regard, each data analytics unit 130 may focus on studying different aspects of the grid operations or catering to a different audience of power engineers/managers/consumers. For the presently described embodiment including only one data analytics unit 130, the data analytics unit 130 may have various functional capabilities. In this regard, the data analytics unit 130 may, for example, be enabled to: (1) collect and store statistics from the micro electrical power grid 100 operation at various granularity levels, organized by time, geographical region, or energy used for power generation; (2) provide a framework to generate reports that help project energy demands by combining operational data with existing models for demand estimation used by power engineers; (3) provide a framework to generate reports that help project energy availability by combining operational data, health of power generators, environmental factors, and weather forecast data with existing models for energy availability estimation used by power engineers; and (4) support long-running simulations of the micro electrical power grid 100 that help demand forecasting, uncover vulnerabilities, or prioritize capital investments to improve the grid infrastructure.

Figure 2:
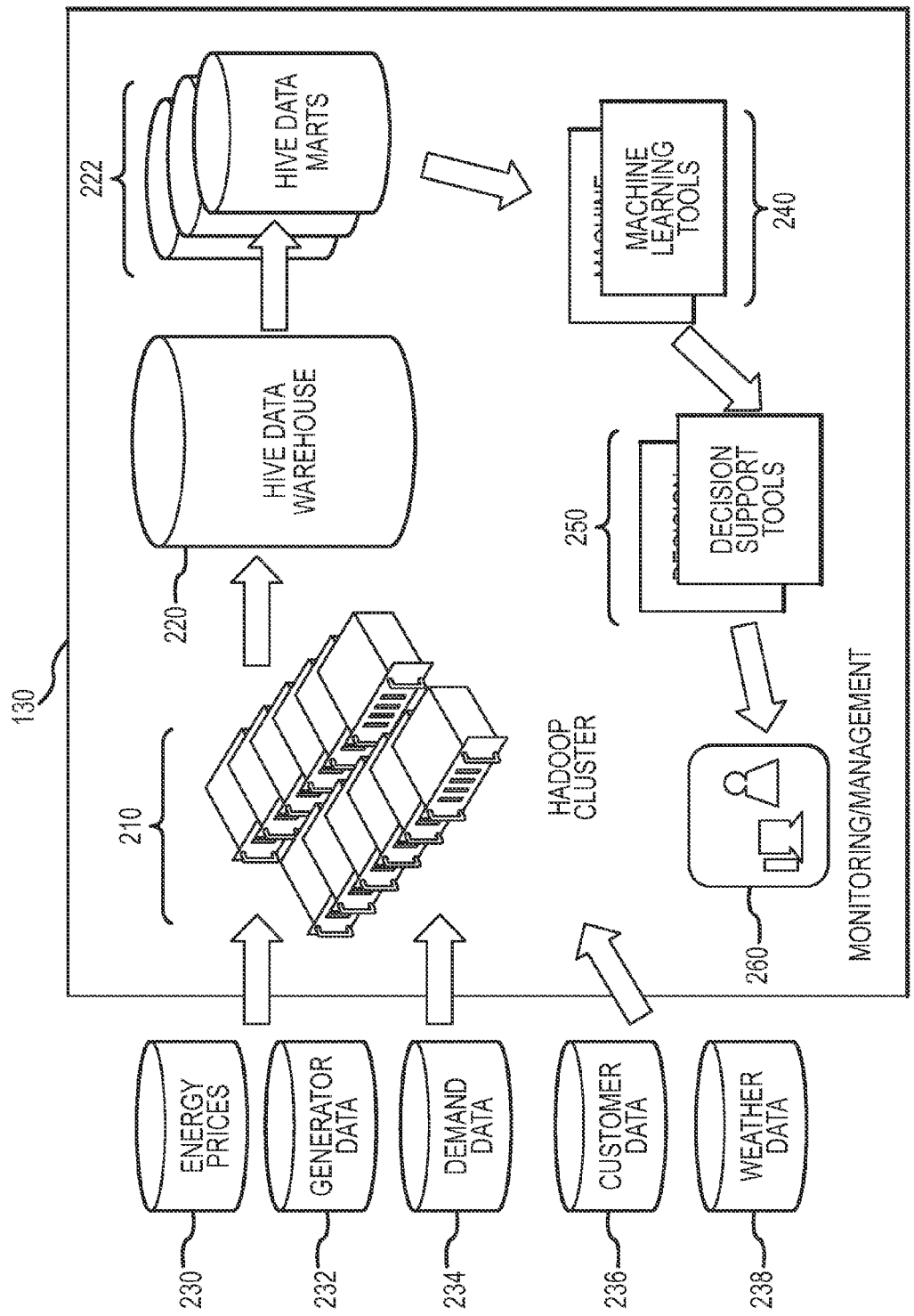
FIG. 2 is a block diagram of one embodiment of a data analytics unit.

FIG. 2 shows one embodiment of a data analytics unit 130 that may be included in a micro electrical power grid 100 such as shown in FIG. 1. The data analytics unit may include one or more data processing devices 210 and a data storage device 220. The one or more data processing devices 210 may receive various categories of data such as, for example, energy pricing data 230, electricity generation/output data 232, electricity demand data 234, customer data 236 and weather data 238. Data such as the electricity generation/output data 232 and electricity demand data 234 may be received from IPBs 120 associated with electrical power sources 102A-102D and electrical loads 104A-104E within a micro electrical power grid 100 such as shown in FIG. 1. Other data such as energy pricing data 230, customer data 236 and weather data 238 may be received from sources outside of the micro electrical power grid 100.

Figure 3:
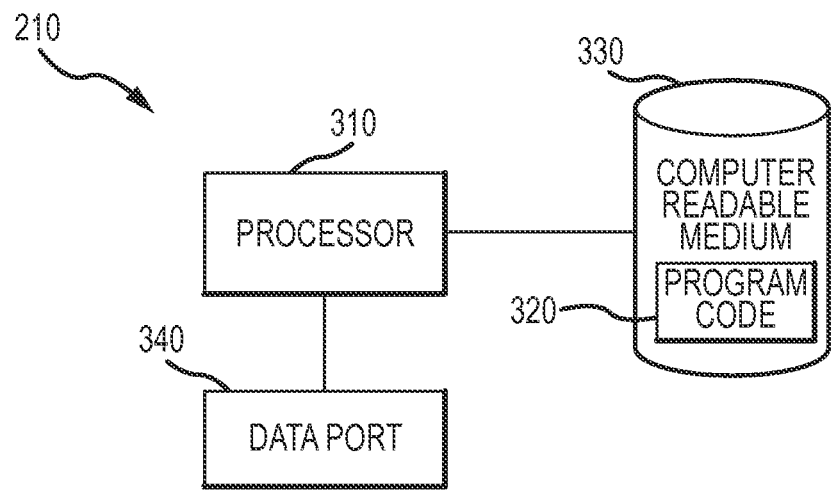
FIG. 3 is block diagram showing one embodiment of a data processing device that may be included a data analytics unit.
Figure 4:
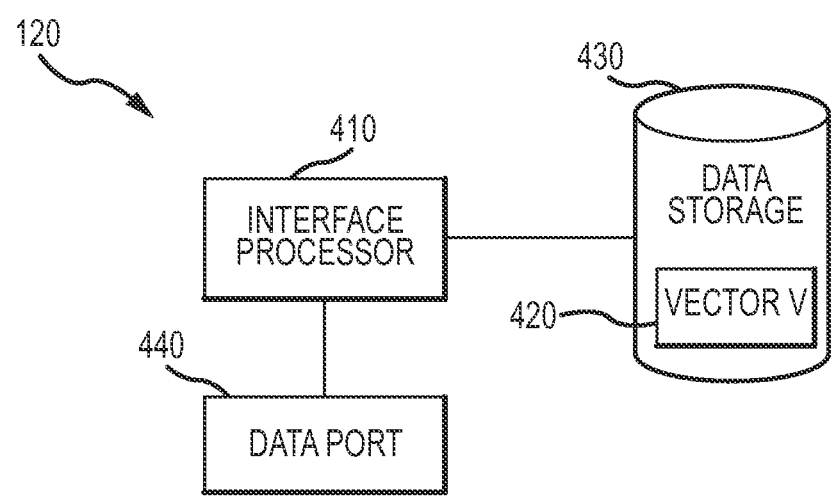
FIG. 4 is block diagram showing one embodiment of an intelligent power broker (IPB) unit.

The data processing device(s) 210 may comprise a cluster of data processing hardware devices executing data analytics software such as, for example, Hadoop developed by the Apache Software Foundation. In this regard, as depicted in FIG. 3, each data processing device 210 may, for example, include one or more computer processors 310 and the data analytics software may comprise computer executable program code 320 stored on a non-transitory computer readable medium 330 (e.g., a hard disc drive, an optical disc, a flash drive), and executable by the one or more computer processors 310. Each data processing device 210 may also include a data communications port 340 (e.g., an Ethernet port, a universal serial bus (USB) port, a wireless communications port, or the like) that enables data to be sent from and received by the computer processor(s) 310. Data may be communicated via the communications port 340 to/from each data processing device 210 to/from another data processing device within the same data analytics unit 130 and/or to/from another data analytics unit 130 or one or more of the IPBs 120 via the data network 140. In this regard, as depicted in FIG. 4, each IPB 120 may include an interface processor 410 enabling the IPB to interface with its respective electrical power source or electrical load as well as interface with a smart meter unit if associated with an electrical load. Each IPB 120 may also include a non-transitory data storage medium 430 for storing data (e.g., in a vector V as discussed herein) and a communications port 440 (e.g., an Ethernet port, a universal serial bus (USB) port, a wireless communications port, or the like) enabling the IPB to transmit and receive data to/from the data network 140.

Referring again to FIG. 2, the data storage device(s) 220 may comprise a Hive Data Warehouse, which provides fast access and processing capabilities to help distill the raw data into meaningful abstractions on which detailed analysis software can operate. The Hive Data Warehouse may be organized into one or more Data Marts. Each Data Mart provides a specific view of the system aimed at a different community/application domain such as, for example, reliability engineers, energy brokers, field operators, and so on.

The data analytics unit 130 may also include one or more machine learning tools 240 and one or more decision support tools 250. In this regard, the machine learning tool(s) 240 and the decision support tool(s) 250 may be implemented in the form of computer executable program code stored on a non-transitory computer readable medium and executable by the one or more computer processors of the data processing device(s) 210. Using data that has been organized within a Data Mart (e.g., data 232, 234 received from the IPBs 120 in the micro electrical power grid 100 and, if provided, other data 230, 236 and 238), the machine learning tool(s) 240 may be used to carry out tasks designed to estimate energy needed to meet demand, weak points in the system, fault occurrence, backup generation that must be activated, loads that might need to be shed, and the like. The information obtained from the machine learning tool(s) 240 may be passed along to the decision support tool(s) 250. The decision support tool(s) 250 help system operators make decisions regarding operating parameters of the micro electrical power grid 100 to ensure proper grid operations. In this regard, the decision support tool(s) 250 may include rich visual interfaces, virtual reality displays, and/or a 3D immersion system that help operators focus on important situations that must be solved. The visual interfaces, virtual reality displays, and/or 3D immersion system may be output on one or more displays devices 260 viewable by the system operators. The decision support tool(s) 250 can also work as autonomous entities that make decisions regarding operating parameters of the micro electrical power grid 100, and simply ask operators to confirm the actions of the decision support tool(s) 250.

The machine learning tool(s) 240 and the decision support tool(s) 250 may implement a number of considerations. One key consideration for the micro electrical power grid 100 is to determine how much electricity to produce from the electrical power sources 102A-102D to meet the demands of the electrical loads 104A-104E. Consider a collection of electrical power sources $S_1, S_2, \ldots, S_n$, (e.g. electrical power sources 102A-102D). Each power source $S_i$ has a maximum generation capacity $C_i$, and at any given moment it can be producing energy at a specific percentage $a_i \in [0,1]$. This value may be referred to as the generation factor of the power source. For example, a value of 0.7 indicates that the power generator is running at 70% capacity. Likewise, a value of 0 means that the generator is off, and a value of 1 means it is working at 100% capacity. Thus, $a_i C_i$ indicates how much energy is being produced by source $S_i$. Hence, at any given point in time the total power generated in the grid, $P_T$ is given by:

$$P_T = \sum_{i=1}^{n} a_i C_i$$

The power grid must serve the power demands of a collection of loads $L_1, L_2, \ldots, L_k$ (e.g., electrical loads 104A-104E), where $D_i$ denotes the demand of load $L_i$. Thus, the total system demand $D_T$ is given by:

$$D_T = \sum_{i=1}^{k} D_i$$

The goal is to find a vector V of parameters $v=(p_1, p_2, \ldots, p_n)$ that indicate how much energy to get from each source such that $P_T=D_T$, while optimizing a specific operational goal. One example of an operational goal is minimizing the total amount of energy produced from fossil fuels. In this regard, given a power source $S_i$, the amount of fossil fuel electricity, $PF_i$, produced by $S_i$ is defined as:

$$PF_i = \begin{cases} 0 & NFF \\ a_i C_i & FF \end{cases}$$

where, FF denotes that the power source is fossil-fueled and NFF indicates the power plant is not fossil-fueled. Another example of an operational goal may be minimizing the total cost of electricity produced by the power sources.

Figure 5:
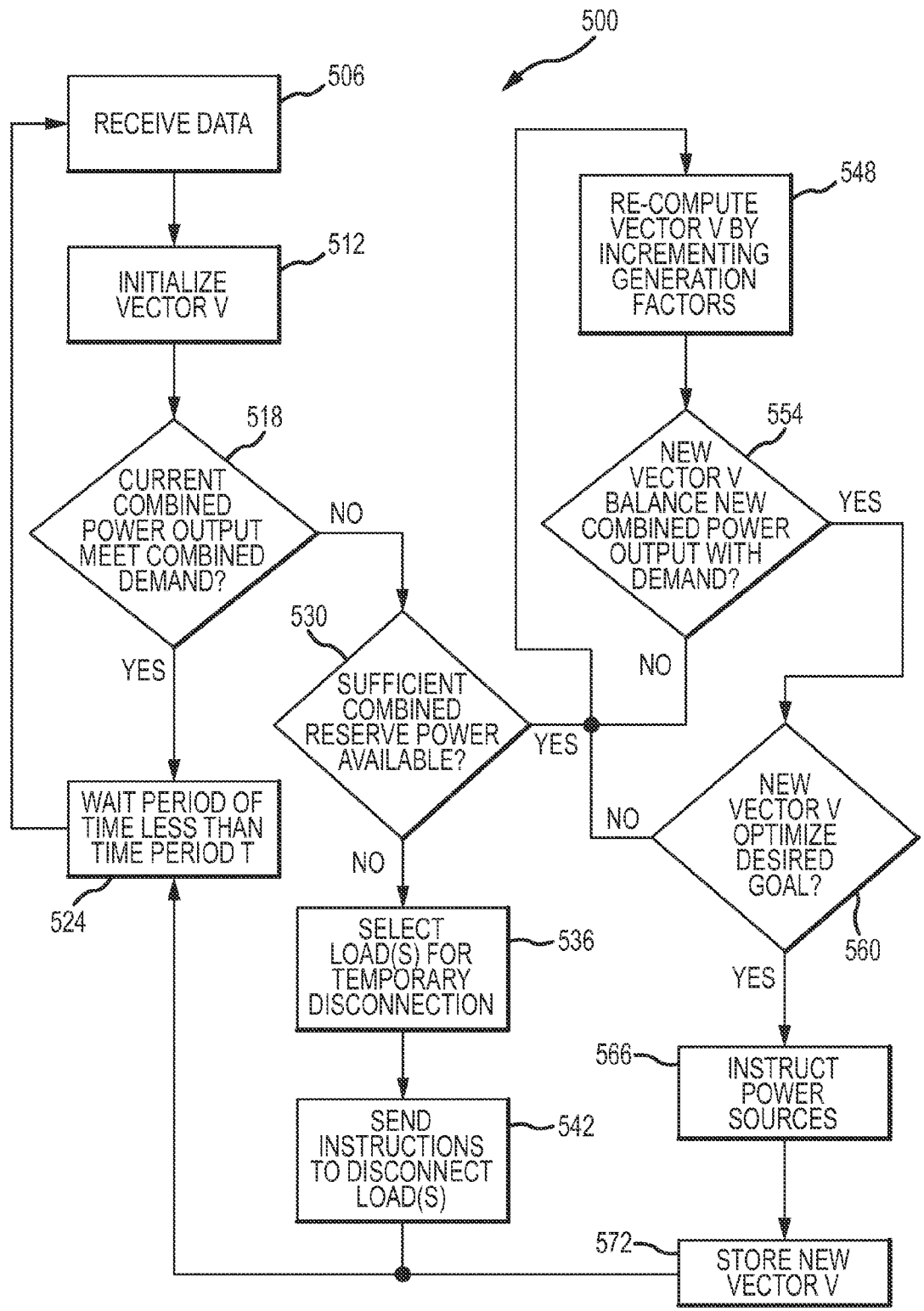
FIG. 5 is a flow diagram showing the steps of one embodiment of a method of managing a micro electrical power grid.

FIG. 5 shows one embodiment of a method 500 of managing a micro electrical power grid. The method 500 of FIG. 5 may be undertaken by a data analytics unit 130 together with IPBs 120 in communication via a data network 140 with the data analytics unit 130 to manage a micro electrical power grid 100 such as depicted in FIG. 1. In this regard, one or more of the steps of method 500 may be performed by executing computer executable program code stored on a non-transitory storage medium with one or more computer processors of the data analytics unit.

The method 500 may be initiated with step 506 in which data is received. The data may be received by one or more data processing devices of a data analytics unit within the micro electrical power grid. Portions of the data may be received from a plurality of intelligent power broker (IPB) units associated with electrical power sources and electrical loads within the micro electrical power grid, and portions of the data may be received from other sources outside of the micro electrical power grid. The received data may, for example, include a current electrical power output level for each electrical power source in the micro electrical grid, an estimated electrical demand level for each electrical load in the micro electrical power grid, an available reserve electrical power generation capability level for each electrical power source in the micro electrical grid, data modeling weather conditions, energy pricing data from energy markets, and customer data.

In step 512, a vector V is initialized with the values of current micro electrical power grid conditions. In this regard, vector V may be initialized using values included in or derived from data received in step 506.

In step 518 a determination is made as to whether a current combined electrical power output level meets an estimated combined electrical power demand level over a time period T. In this regard, the current combined electrical output level may be obtained by adding together current electrical power output level included in vector V for each electrical power source in the micro electrical grid and the estimated combined power demand level may be obtained by adding together the estimated electrical demand level included in vector V for each electrical load in the micro electrical power grid. If it is determined in step 518 that the current combined electrical power output level meets the estimated combined electrical power demand level over time period T, then the method 500 waits in step 524 for a period of time less than T and thereafter returns to step 506 to begin the method 500 again for time period subsequent to time period T. In this regard, time period T and the subsequent time period may overlap, or the subsequent time period may begin following completion of time period T. If it is determined in step 518 that the current combined electrical power output level does not meet the estimated combined electrical power demand level over time period T, then the method proceeds to step 530.

In step 530, a determination is made as to whether the combined reserve electrical power generation level is sufficient to meet the combined electrical power demand level over time period T when added to the current combined electrical power output level. In this regard, the combined reserve electrical power generation level may be obtained by adding together the reserve electrical power generation level included in vector V for each electrical power source included in the micro electrical grid. If it is determined in step 530 that there is sufficient combined reserve electrical power generation available within the micro electrical power grid then the method 500 proceeds to step 548. If it is determined in step 530 that there is not sufficient combined reserve electrical power generation available within the micro electrical power grid then the method 500 proceeds to step 536.

In step 536, one or more of the electrical power loads are identified for temporary disconnection from the micro electrical grid in order to balance the combined electrical power output level during time period T with a revised estimated combined electrical power demand level for the remaining electrical power loads during time period T. In this regard, customer data indicating that a particular load is low priority or on an interruptible contract may be used to help identify one or more electrical loads for temporary disconnection during time period T. In step 542, instructions may be sent via one or more IPBs to temporarily disconnect their associated load(s) during time period T. In this regard, an IPB may coordinate with its associate smart meter in order to disconnect its associate load from the micro electrical power grid. Thereafter, the method 500 may return to step 506 to begin the process again for a subsequent time period.

In step 548, vector V is re-computed to include new electrical power output levels for the electrical power sources. In this regard, a new vector V may be re-computed in a variety of manners including for example by incrementing the generation factor of one or more of the electrical power sources having available reserve generation capacity by an amount p. The increment amount p may be small and may be obtained in a variety of manners including, for example, by using a constant value for p, using a randomly generated number in the range [0,1] for p, using a randomly generated number drawn from a probability distribution in range [0,1] for p, or using an average value obtained from past information for p.

After completing step 548, in step 554 a determination is made as to whether re-computed vector V represents a solution that balances the combined electrical power demand level with the combined electrical power output level of re-computed vector V. If it is determined in step 554 that re-computed vector V does not balance the combined electrical power demand level with the combined electrical power output level, then the method 500 may return to re-computing step 548. If it is determined in step 554 that re-computed vector V balances the combined electrical power demand level with the combined electrical power output level, then in step 560 a determination may be made as to whether re-computed vector V optimizes a desired goal such as, for example, maximizing the amount of electricity provided by renewable electrical power sources and reducing the cost of electricity generated in the micro electrical power grid. If it is determined in step 560 that re-computed vector V optimizes the desired goal, then the method may proceed to step 566. If it is determined in step 560 that re-computed vector V does not optimize the desired, goal then the method 500 may return to step 548.

In step 566, the electrical power sources may be instructed to provide electricity in accordance with the re-computed vector V. In this regard, the data analytics unit may send instructions to the IPBs associated with the electrical power sources via the data network of the micro electrical power grid.

In step 572, the new micro electrical power grid configuration represented by re-computed vector V may be stored. In this regard, re-computed vector V may, for example, be stored in a data storage device of the data analytics unit.

In step 578, the method 500 waits for a period of time less than the time period T. Thereafter, the method returns to step 506 to commence the method for a period of time subsequent to time period T.

The method 500 may be run constantly or intermittently, as desired, throughout the micro electrical power grid. In this regard, the method 500 may be run by the data analytics unit and vector V may be disseminated to the various IPBs within the micro electrical power grid. The IPBs may then use vector V to request/generate more electrical power or to make adjustments to their current configuration. The IPBs may also be enabled to modify vector V based on local information not yet received by the data analytics unit.

Deviations may be made from the specific embodiments disclosed in the specification without departing from the spirit and scope of the invention. For example, at least some of the functionalities performed by many of the processes and modules discussed herein may be performed by other modules, devices, processes, etc. The illustrations and discussion herein has only been provided to assist the reader in understanding the various aspects of the present disclosure.

A computer program (also known as a program, software, software application, script, or code) used to provide the functionality described herein (such as to provide the data analytics unit and/or IPB functionalities disclosed herein) may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A system operable to control a micro electrical power grid comprising one or more electrical power sources and one or more electrical loads, said system comprising:
    a plurality of intelligent power broker (IPB) units, each said IPB unit being associated with an electrical power source or an electrical load and operable to collect data relating to its associated electrical power source or electrical load, wherein the data collected by an IPB unit associated with an electrical power source includes a current electrical power output level and a reserve electrical power generation level, and wherein the data collected by an IPB unit associated with an electrical load includes an electrical power demand level; and
    at least one data analytics unit in communication with said IPB units, said at least one data analytics unit receiving, in real time, the data from said IPB units and being operable to analyze the data in real time to estimate a combined electrical power output level of the electrical power sources, a combined reserve electrical power generation capability level of the electrical power sources and a combined electrical power demand level of the electrical loads during a time period T, said data analytics unit being further operable to direct the IPB units in real time to accomplish at least one of removing one or more of the electrical power loads from the micro electrical power grid and increasing an electrical power output from the electrical power sources during time period T.

2. The system of claim 1 wherein each said IPB unit associated with an electrical power source is operable to achieve one or more of:
    monitoring a current operational health of the electrical power source;
    monitoring a current power output level of the electrical power source;
    monitoring a reserve power generation level of the electrical power source;
    monitoring energy reserves of the electrical power source;
    requesting a change in generation from the electrical power source; and
    collecting operational data relating to the electrical power source and providing the operational data to said data analytics unit.

3. The system of claim 1 wherein said data analytics unit is operable to:
    increment a generation factor for each electrical power source by an amount p to achieve increased electrical power output from the electrical power sources during time period T;
    determine whether the combined electrical power demand level will be balanced by a combined electrical power output level corresponding with the incremented generation factors;
    repeat the incrementing and determining when it is determined that the combined electrical power demand level is not balanced with the electrical power output level corresponding with the incremented generation factors; and
    instruct the IPB units to increase electrical power output from their associated electrical power sources in accordance with the incremented generation factors when it is determined that the combined electrical power demand level is balanced with the electrical power level corresponding with the incremented generation factors.

4. The system of claim 3 wherein said data analytics unit is operable to increment a generation factor for each electrical power source by an amount p by at least one of:
    using a predetermined constant value for p;
    using a randomly generated number in the range zero to one for p;
    using a randomly generated number drawn from a probability distribution in range zero to one for p; and
    using an average value obtained from past information for p.

5. The system of claim 3 wherein, when it is determined that the combined electrical power demand level is balanced with the electrical power output level corresponding with the incremented generation factors, said data analytics unit is further operable to:
    assess whether combined the electrical power output level corresponding with the incremented generation factors optimizes a desired goal prior to proceeding with the instructing;
    proceed with the instructing when the combined electrical power output level corresponding with the incremented generation factors optimizes the desired goal; and
    repeat the incrementing and determining when the combined electrical power output level corresponding with the incremented generation factors does not optimize the desired goal.

6. The system of claim 5 wherein said desired goal comprises at least one of maximization of electricity from renewable electrical power sources in the micro electrical power grid and minimization of the cost of electricity within the micro electrical power grid.

7. The system of claim 6 wherein data analytics unit is operable to receive at least one of data models for weather conditions and pricing data from energy markets.

8. The system of claim 3 further comprising:
    a data storage system storing information from the data analytics unit representing the current micro power grid configuration, wherein the information comprises a vector V including values of current electrical power output levels of the electrical power sources, reserve electrical power generation levels of the electrical power sources and electrical power demand levels of the electrical loads during a time period T.

9. The system of claim 3 wherein said data analytics unit is operable to repeat said receiving, determining and directing prior to expiration of time period T for a time period subsequent to time period T.

10. The system of claim 1 wherein said data analytics unit comprises a processor and program instructions stored on a non-transitory machine readable media and executable by said processor.

11. A method of managing a micro electrical power grid comprising one or more electrical power sources and one or more electrical loads, said method comprising:
- receiving, in real time, data from a plurality of intelligent power broker (IPB) units, wherein each IPB unit is associated with an electrical power source or an electrical load, wherein the data received from an IPB unit associated with an electrical power source includes a current electrical power output level and a reserve electrical power generation level, and wherein the data received from an IPB unit associated with an electrical load includes an electrical power demand level;
- in response to receiving the data from the plurality of IPB units, initializing a vector V with values of current micro electrical power grid conditions, wherein V includes values of current electrical power output levels of the electrical power sources, reserve electrical power generation levels of the electrical power sources and electrical power demand levels of the electrical loads during a time period T;
- first determining whether a current combined electrical power output level meets a combined electrical power demand level over time period T;
- when it is determined that the combined electrical power output level meets the combined electrical power demand level, repeating said steps of receiving, initializing and first determining for a subsequent time period prior to expiration of time period T;
- when it is determined that the combined electrical power output level does not meet the combined electrical power demand level, second determining whether a combined reserve electrical power generation level is sufficient to meet the combined electrical power demand level when added to the current combined electrical power output level;
- when it is determined that there is sufficient combined reserve electrical power generation, re-computing vector V to include new electrical power output levels for the electrical power sources and instructing the electrical power sources via their associated IPB units to produce electrical energy at the new electrical power output levels specified in recomputed vector V; and
- when it is determined that there is not sufficient combined reserve electrical power generation capability, identifying one or more of the electrical power loads for temporary disconnection from the micro electrical power grid during time period T to achieve a reduced combined electrical power demand level balanced by the current combined electrical power output level.

12. The method of claim 11 wherein said re-computing vector V comprises:
- incrementing a generation factor for each electrical power source by an amount p; and
- third determining whether re-computed vector V represents a solution that balances the combined electrical power demand level with the combined electrical power output level in accordance with re-computed vector V;
- proceeding with said instructing when it is determined that re-computed vector V represents a solution that balances the combined electrical power demand level with the combined electrical power output level in accordance with re-computed vector V; and
- repeating said incrementing and third determining when it is determined that re-computed vector V represents a solution that does not balance the combined electrical power demand level with the combined electrical power output level in accordance with re-computed vector V.

13. The method of claim 12 wherein said incrementing comprises at least one of:
- using a predetermined constant value for p;
- using a randomly generated number in the range zero to one for p;
- using a randomly generated number drawn from a probability distribution in the range zero to one for p; and
- using an average value obtained from past information for p.

14. The method of claim 12, when it is determined that re-computed vector V represents a solution that balances the combined electrical power demand level with the combined electrical power output level in accordance with re-computed vector V, further comprising:
- fourth determining whether re-computed vector V optimizes a desired goal prior to proceeding with said instructing;
- proceeding with said instructing when it is determined that re-computed vector V optimizes the desired goal; and
- repeating said incrementing and third determining steps when it is determined that re-computed vector V does not optimize the desired goal.

15. The method of claim 14 wherein the desired goal comprises one of maximizing the amount of electricity provided by renewable electrical power sources in the micro electrical power grid and minimizing the cost of electricity generated within the micro electrical power grid.

16. The method of claim 15 further comprising at least one of:
- receiving data models for weather conditions; and
- receiving pricing data from energy markets.

17. The method of claim 12 further comprising:
- storing the re-computed vector V in a data storage device of a data analytics unit included in the micro electrical power grid.

18. The method of claim 11 further comprising:
- repeating said receiving, initializing and first determining for a subsequent time period prior to expiration of time period T.

19. The method of claim 11 further comprising executing program instructions stored on a non-transitory machine readable media with a computer processor to accomplish one or more of said receiving, initializing, first determining, repeating, second determining, re-computing and identifying.

20. A computer program product executable to manage a micro electrical power grid comprising one or more electrical power sources and one or more electrical load, said computer program product stored on a non-transitory computer usable medium and including instructions configured to cause at least one processor to:
- initialize a vector V with values of current micro electrical power grid conditions, wherein V includes values of current electrical power output levels of the electrical power sources, reserve electrical power generation levels of the electrical power sources and electrical power demand levels of the electrical loads during a time period T;
- first determine, in real time, whether a current combined electrical power output level meets a combined electrical power demand level over time period T based on the vector V;

when it is determined that the combined electrical power output level meets the combined electrical power demand level, to repeat said initializing and first determining for a subsequent time period prior to expiration of time period T;

when it is determined that the combined electrical power output level does not meet the combined electrical power demand level, to second determine whether a combined reserve electrical power generation level is sufficient to meet the combined electrical power demand level when added to the current combined electrical power output level;

when it is determined that there is sufficient combined reserve electrical power generation, to recompute vector V to include new electrical power output levels for the electrical power sources and generate instructions for the electrical power sources to produce electrical energy at the new electrical power output levels specified in recomputed vector V; and when it is determined that there is not sufficient combined reserve electrical power generation capability, to identify one or more of the electrical power loads for temporary disconnection from the micro electrical power grid during time period T to achieve a reduced combined electrical power demand level balanced by the current combined electrical power output level.

* * * * *